US008180187B2

(12) United States Patent
Bunch et al.

(10) Patent No.: US 8,180,187 B2
(45) Date of Patent: May 15, 2012

(54) SYSTEMS AND METHODS FOR GIMBAL MOUNTED OPTICAL COMMUNICATION DEVICE

(75) Inventors: Brian P. Bunch, Snohomish, WA (US); Steve Mowry, Duvall, WA (US); Paul Ferguson, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/252,090

(22) Filed: Oct. 15, 2008

(65) Prior Publication Data

US 2010/0092179 A1 Apr. 15, 2010

(51) Int. Cl.
*G02B 6/00* (2006.01)

(52) U.S. Cl. ........................................ 385/26; 385/25

(58) Field of Classification Search .................... 385/25, 385/26

See application file for complete search history.

(56) References Cited

U.S. PATENT DOCUMENTS

| | | | | |
|---|---|---|---|---|
| 4,404,592 | A * | 9/1983 | Pepin et al. | 348/169 |
| 4,425,905 | A * | 1/1984 | Mori | 126/578 |
| 4,433,337 | A | 2/1984 | Smith et al. | |
| 4,529,986 | A * | 7/1985 | d'Auria et al. | 342/433 |
| 5,838,278 | A | 11/1998 | Tsujisawa et al. | |
| 6,262,687 | B1 | 7/2001 | Bai et al. | |
| 6,911,950 | B2 | 6/2005 | Harron | |
| 7,183,966 | B1 | 2/2007 | Schramek et al. | |
| 7,262,679 | B2 | 8/2007 | Mehdizadeh et al. | |
| 7,378,769 | B2 | 5/2008 | Head | |
| 7,933,477 | B2 * | 4/2011 | Shigeno et al. | 385/25 |
| 2002/0083573 | A1 | 7/2002 | Matz et al. | |
| 2002/0084948 | A1 | 7/2002 | Watson | |
| 2002/0184640 | A1 | 12/2002 | Schnee et al. | |
| 2003/0030863 | A1 * | 2/2003 | Frey et al. | 359/114 |
| 2003/0194177 | A1 * | 10/2003 | Tietjen | 385/26 |

(Continued)

FOREIGN PATENT DOCUMENTS

GB 1051913 12/1966

(Continued)

OTHER PUBLICATIONS

I.D. Aggarwal et al. Infrared (IR) photonic bandgap fibers for missile defense. Article in Aircraft Survivability, Summer 2006, pp. 12-15 (published by Joint Aircraft Survivability Program Office). Retrieved from http://www.bahdayton.com/surviac/asnews/AS%20Journal%20Summer%202006.pdf.*

*Primary Examiner* — Mike Stahl
(74) *Attorney, Agent, or Firm* — Lowe Graham Jones PLLC

(57) ABSTRACT

Optical communication systems and methods are operable to communicate optical signals across a gimbal system. An exemplary embodiment has a first optical rotary joint with a rotor and a stator, a second optical rotary joint with a rotor and a stator, and an optical connector coupled to the stators of the first and the second optical rotary joints. The stator of the first optical rotary joint is affixed to a first rotational member of the gimbal system. The stator of the second optical rotary joint is affixed to a second rotational member of the gimbal system. A first optical connection coupled to the rotor of the first optical rotary joint and a second optical connection coupled to the rotor of the second optical rotary joint remain substantially stationary as the gimbal system orients an optical communication device in a desired position.

15 Claims, 3 Drawing Sheets

U.S. PATENT DOCUMENTS

| | | | | |
|---|---|---|---|---|
| 2004/0061601 | A1 | 4/2004 | Freakes et al. | |
| 2005/0164636 | A1 | 7/2005 | Palermo et al. | |
| 2007/0008514 | A1 * | 1/2007 | Krasutsky | 356/4.01 |
| 2007/0075182 | A1 | 4/2007 | Fetterly | |
| 2007/0075237 | A1 | 4/2007 | Mills et al. | |
| 2007/0194170 | A1 | 8/2007 | Ellison et al. | |
| 2007/0217736 | A1 | 9/2007 | Zhang et al. | |
| 2008/0084357 | A1 | 4/2008 | Smeltzer | |
| 2010/0092179 | A1 | 4/2010 | Bunch et al. | |

FOREIGN PATENT DOCUMENTS

| | | | |
|---|---|---|---|
| GB | 2310975 | A | 10/1997 |
| JP | 2007-274057 | A * | 10/2007 |
| WO | 0205383 | A1 | 1/2002 |
| WO | 2006065892 | A2 | 6/2006 |
| WO | 20080141297 | A1 | 11/2008 |

* cited by examiner

SYSTEMS AND METHODS FOR GIMBAL MOUNTED OPTICAL COMMUNICATION DEVICE

BACKGROUND OF THE INVENTION

Various devices may be mounted on a single axis, a two-axis, or a three-axis gimbal to facilitate orientation of the device towards a desired direction. FIG. 1 illustrates a prior art radar antenna 102 and a two-axis gimbal system 104. When the radar antenna 102 is affixed to the gimbal system 104, the radar antenna 102 may be pointed in a desired horizontal and/or vertical direction. When the gimbal system 104 includes motors, the radar antenna 102 may be oriented on a real time basis.

For example, when the radar antenna 102 is used in a vehicle, such as an aircraft or a ship, the radar antenna 102 may be continuously swept in a back-and-forth manner along the horizon, thereby generating a view of potential hazards on a radar display. As another example, the radar antenna 102 may be moved so as to detect a strongest return signal, wherein a plurality of rotary encoders or other sensors on the gimbal system 104 provide positional information for determining the direction that the radar antenna 102 is pointed. Thus, based upon a determined orientation of the radar antenna 102, and also based upon a determined range of a source of a detected return signal of interest, a directional radar system is able to identify a location of the source.

The two-axis gimbal system 104 includes a support member 106 with one or more support arms 108 extending therefrom. A first rotational member 110 is rotatably coupled to the support arms 108 to provide for rotation of the radar antenna 102 about the illustrated Z-axis. The first rotational member 110 is rotatably coupled to a second rotational member 112 to provide for rotation of the radar antenna 102 about the illustrated Y-axis, which is perpendicular to the Z-axis.

A moveable portion 114 of the gimbal system 104 may be oriented in a desired position. One or more connection members 116, coupled to the moveable portion 114, secure the radar antenna 102 to the gimbal system 104. Motors (not shown) operate the rotational members 110, 112, thereby pointing the radar antenna 102 in a desired direction.

The gimbal system 104 is affixed to a base 118. The base 118 may optionally house various electronic components therein (not shown), such as components of a radar system. Electronic components coupled to the radar antenna 102, such as the optical communication device 120, are communicatively coupled to the radar system (or to other remote devices) via an optical connection 122. The optical communication device 120 processes detected radar returns into an optical signal that is then communicated to a radar system. The optical connection 122 may be a fiber optic connection that communicates an optical information signal from the optical communication device 120 corresponding to radar signal returns detected by the radar antenna 102.

As illustrated in FIG. 1, the optical connection 122 is physically coupled to the base 118. The optical connection 122 flexes as the optical communication device 120 and the antenna 102 are moved by the gimbal system 104.

Over long periods of time, the optical connection 122, and/or its respective point of attachment 124, may wear and potentially fail due to the repeated flexing as the radar antenna 102 is moved by the gimbal system 104. Failure of the optical connection 122 may result in a hazardous operating condition, such as when the radar antenna 102 and the gimbal system 104 are deployed in an aircraft. Thus, failure of the optical connection 122 would cause a failure of the aircraft's radar system. Accordingly, it is desirable to prevent failure of the optical connection 122 so as to ensure secure and reliable operation of the radar antenna 102.

SUMMARY OF THE INVENTION

Systems and methods of communicating optical signals across a gimbal system are disclosed. An exemplary embodiment has a first optical rotary joint with a rotor and a stator, a second optical rotary joint with a rotor and a stator, and an optical connector coupled to the stators of the first and the second optical rotary joints. The stator of the first optical rotary joint is affixed to a first rotational member of the gimbal system. The stator of the second optical rotary joint is affixed to a second rotational member of the gimbal system. A first optical connection coupled to the rotor of the first optical rotary joint and a second optical connection coupled to the rotor of the second optical rotary joint remain substantially stationary as the gimbal system orients an optical communication device in a desired position.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
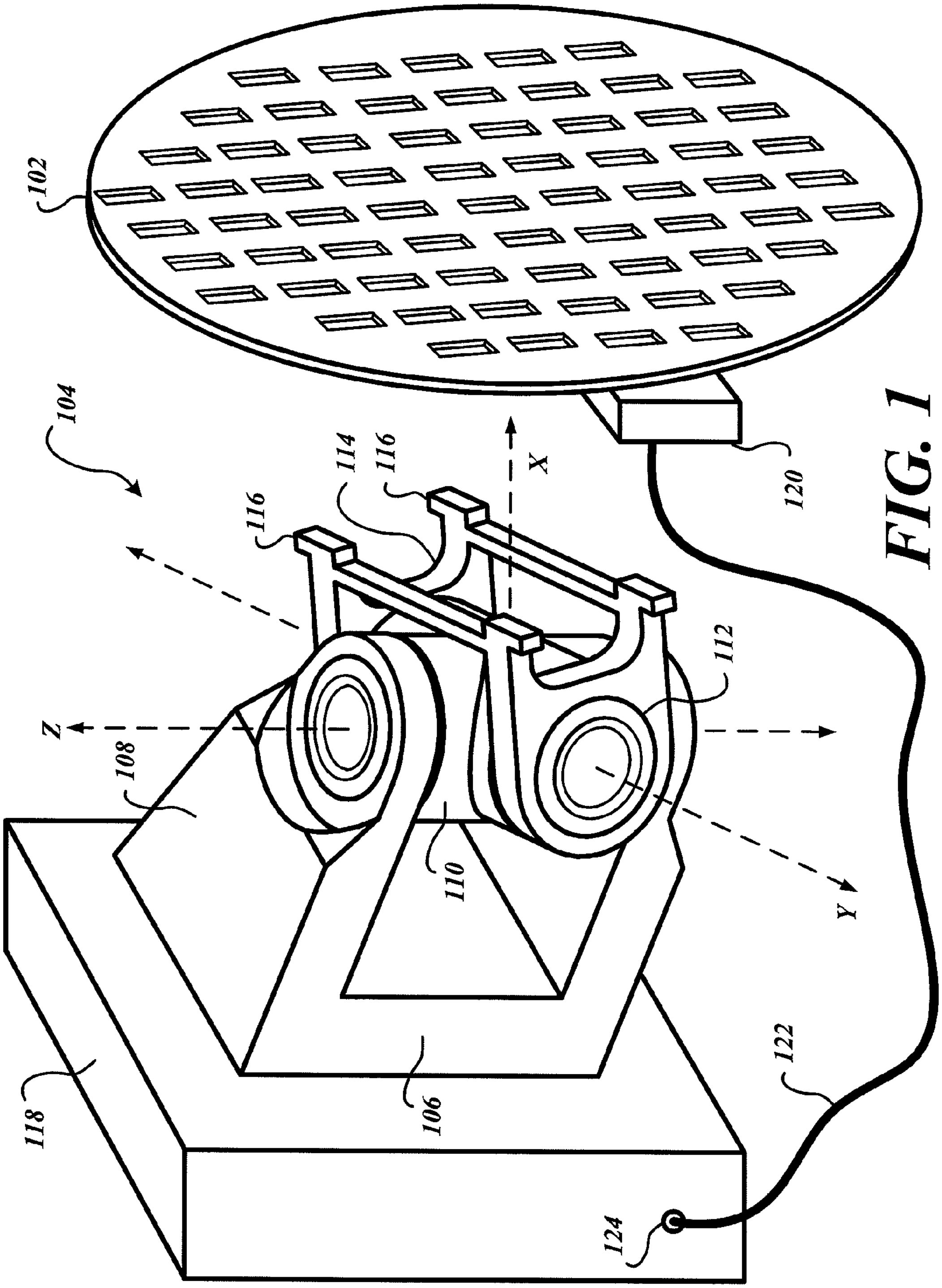
FIG. 1 (PRIOR ART)
FIG. 1 illustrates a prior art radar antenna and a two-axis gimbal system.
Figure 2:
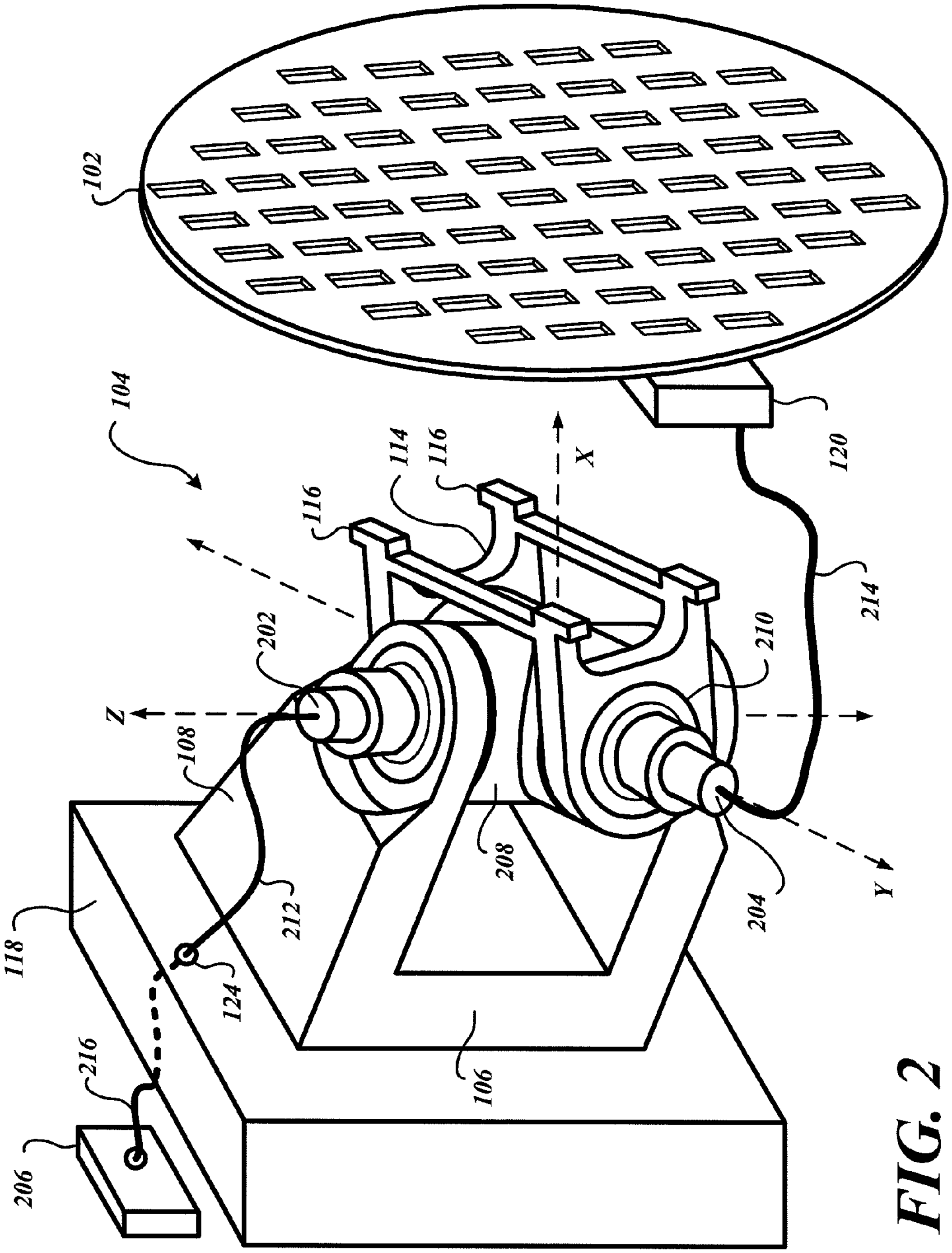
FIG. 2 is a perspective view of an optical information transfer gimbal system.

FIG. 2 is a perspective view of an optical information transfer gimbal system 200. The exemplary optical information transfer gimbal system 200 is illustrated as a two-axis gimbal. A first fiber optic rotary joint 202 and a second fiber optic rotary joint 204 are part of an optical communication path between an optical communication device 120 and a remote device 206. The optical communication device 120 and the remote device 206 are configured to communicate with each other using an optical medium.

The first fiber optic rotary joint 202 is integrated into a first rotational member 208. The first rotational member 208 is rotatably coupled to the support arms 108 to provide for rotation of the radar antenna 102 about the illustrated Z-axis, similar to the above-described first rotational member 110. However, the first rotational member 208 is configured to receive and secure the first fiber optic rotary joint 202.

The second fiber optic rotary joint 204 is integrated into a second rotational member 210. The second rotational member 210 provides for rotation of the radar antenna 102 about the illustrated Y-axis, which is perpendicular to the Z-axis, and similar to the above-described second rotational member 112. However, the second rotational member 210 is configured to receive and secure the second fiber optic rotary joint 204.

Figure 3:
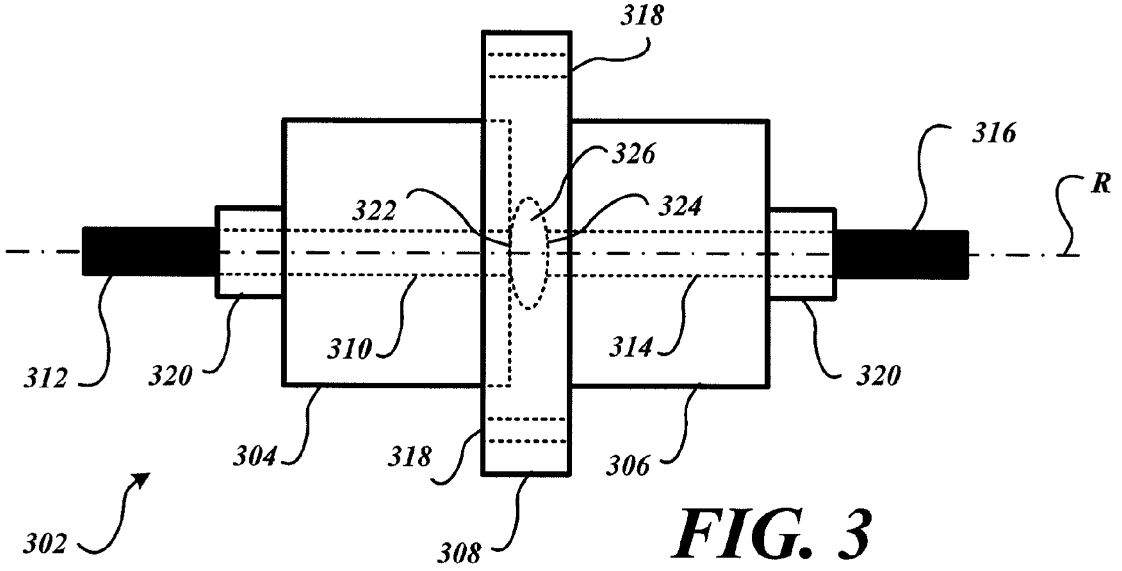
FIG. 3 is a simplified block diagram of an exemplary optical rotary joint employed by embodiments of the optical information transfer gimbal system.

FIG. 3 is a simplified block diagram of an exemplary optical rotary joint 302 employed by embodiments of the optical information transfer gimbal system 200. The exemplary optical rotary joint 302 corresponds to the first fiber optic rotary joint 202 and the second fiber optic rotary joint 204 illustrated in FIG. 2.

The optical rotary joint 302 comprises a rotor 304, a stator 306, and an optional collar 308. A bore 310 or the like in the rotor 304 is configured to receive an end portion of an optical connection 312 or another optical structure. In one embodiment, the optical cable extends out from the optical rotary joint 302 to the remote device 206. A bore 314 or the like in the stator 306 is configured to receive an end portion of a second optical connection 316 or another optical structure. The optional collar 308 includes an optional plurality of apertures 318 through which screws, bolts or other suitable fasteners may be used to secure the optical rotary joint 302 to its respective rotational member (not shown). Some embodiments may include optional collars 320 or the like to facilitate coupling of the rotor 304 to the end portion of the optical connection 312, and/or to facilitate coupling of the stator 306 to the end portion of the optical connection 316.

The optical rotary joint 302 is configured to secure the optical connection end 322 of the end portion of the optical connection 312, or another optical structure, in proximity to a region 326. Further, a second end 324 of the end portion of the optical connection 316, or another optical structure, is secured in proximity to the region 326. Accordingly, light carrying an optically encoded signal may be communicated between the optical connection ends 322, 324 via the region 326. The region 326 may have air, gas, index-matching gel, or another index matched material to facilitate communication of light between the optical connection ends 322, 324.

The end portion of the optical connections 312, 316 are aligned along a common axis of rotation (R). The rotor 304 is free to rotate about the axis of rotation. Since the end portion of the optical connection 312 is secured within the bore 310 of the rotor 304, the rotational member is free to rotate without imparting a stress on the end portion of the optical connection 312.

Figure 4:
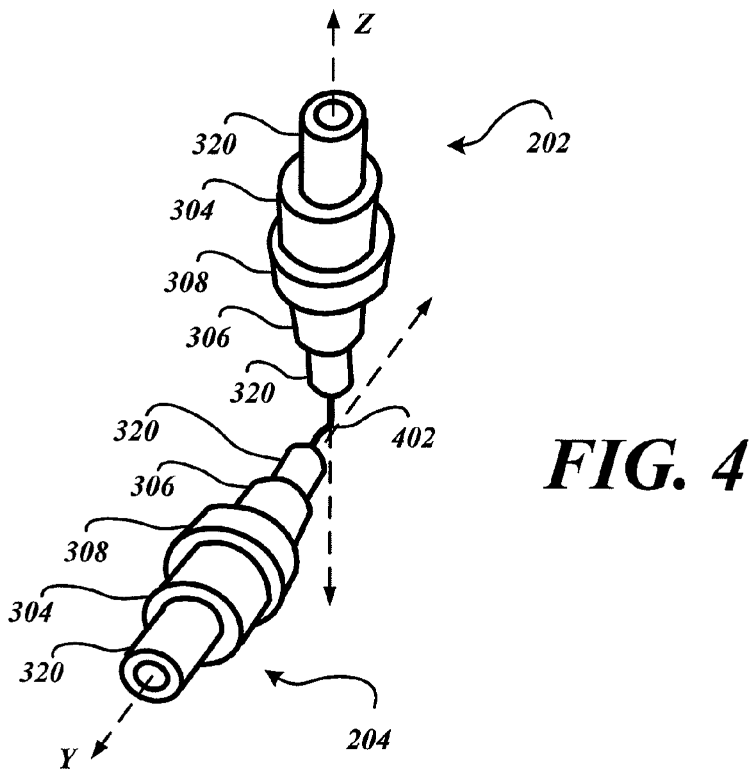
FIG. 4 is a perspective view illustrating orientation of the two optical rotary joints of an embodiment of the optical information transfer gimbal system.

FIG. 4 is a perspective view illustrating orientation of the two optical rotary joints 202, 204 of an embodiment of the optical information transfer gimbal system. The rotational axis of the first fiber optic rotary joint 202 is aligned along the Z axis of the optical information transfer gimbal system 200. The rotational axis of the second fiber optic rotary joint 204 is aligned along the Y axis of the optical information transfer gimbal system 200 (FIG. 2). The stator 306 of the first fiber optic rotary joint 202 and the stator of the second fiber optic rotary joint 204 optically couple to an optical connector 402 such that optical signals can be communicated there through. The optical connector 402 may be a short portion of fiber optic cable or another suitable optical connector such as a wave guide or the like. Since the stator 306 of the first fiber optic rotary joint 202 is affixed to the first rotational member 208 (not illustrated in FIG. 4), and since the stator 306 of the second fiber optic rotary joint 204 is affixed to the second rotational member 210 (not illustrated in FIG. 4), the optical connector 402 remains in a substantially stationary position as the optical information transfer gimbal system 200 moves the antenna 102 (FIG. 2).

FIG. 2 illustrates a first optical connection 212 between the base 118 and the first fiber optic rotary joint 202, a second optical connection 214 between the optical communication device 120 and the second fiber optic rotary joint 204, and a third optical connection 216 between the base 118 and the remote device 206. (Alternatively, the second optical connection 214 may be directly connected to the remote device 206.) Optical connections 212, 214, and/or 216 may be an optical fiber, optical cable, or the like.

During movement of the antenna 102, the first optical connection 212 and the second optical connection 214, having their ends secured to their respective rotor 304 (FIG. 3), remains in a substantially stationary position. That is, as the first rotational member 208 rotates, the rotation of the rotor 304 of the first fiber optic rotary joint 202 allows the first optical connection 212 to remain substantially stationary, thereby avoiding potentially damaging stresses that might otherwise cause failure of the first optical connection 212. Similarly, as the second rotational member 210 rotates, the rotation of the rotor 304 of the second fiber optic rotary joint 204 allows the second optical connection 214 to remain substantially stationary, thereby avoiding potentially damaging stresses that might otherwise cause failure of the second optical connection 214.

As noted above, optical signals are communicated between the optical communication device 120 and the remote device 206. Such optical signals are communicated via the optical connections 212, 214, 216, the optical connector 402, and the fiber optic rotary joints 202, 204. The optical connections 212, 214, 216, and the optical connector 402, remain substantially stationary as the optical information transfer gimbal system 200 moves the antenna 102.

In alternative embodiments, the optical information transfer gimbal system 200 may be a three-axis gimbal system, or a gimbal system with more than three axis. For each gimbal axis, an optical rotary joint 302 is used to provide a rotatable optical connection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. An optical communication system comprising:

a gimbal comprising:

- a first rotational member configured to rotate about a first axis;
- a second rotational member configured to rotate about a second axis; and
- a moveable portion affixed to the first rotational member, wherein the moveable portion is oriented in a desired position by at least one of a first rotation of the first rotational member and a second rotation of the second rotational member;

a first optical rotary joint comprising a first rotor and a first stator, wherein the first stator is affixed to the first rotational member;

a second optical rotary joint comprising a second rotor and a second stator, wherein the second stator is affixed to the second rotational member; and an optical connector coupled to the first stator and the second stator, wherein the optical connector is substantially stationary with respect to the first and second stators as the gimbal orients the moveable portion in the desired position.

2. The optical communication system of claim 1, further comprising:

an optical connection with a first end coupled to the rotor of the first optical rotary joint and a second end coupled to an optical communication device that is physically coupled to the moveable portion of the gimbal, wherein the first end of the optical connection remains in a substantially stationary position as the gimbal orients the moveable portion in the desired position.

3. The optical communication system of claim 2, wherein the optical connection is a first optical connection, and further comprising:

a second optical connection with a first end coupled to the rotor of the second optical rotary joint and a second end coupled to a remote device configured to communicate optical information signals, wherein the first end of the second optical connector remains in a substantially stationary position as the gimbal system orients the moveable portion in the desired position.

4. The optical communication system of claim 3, wherein the optical communication device and the remote device communicate an optical information signal between each other via the first optical connection, the optical connector, and the second optical connection.

5. The optical communication system of claim 1, further comprising:

a radar antenna affixed to the moveable portion of the gimbal, wherein the gimbal points the radar antenna in a desired direction;

an optical communication device physically coupled to the moveable portion, wherein the optical communication device is configured to receive a detected radar return signal from the antenna and is configured to communicate an optical information signal corresponding to the detected radar return signal; and an optical connection with a first end coupled to the rotor of the first optical rotary joint and a second end coupled to the optical communication device, wherein the optical connection is configured to receive the optical information signal from the optical communication device, wherein the first end of the optical connection remains in a substantially stationary position as the gimbal points the radar antenna in the desired direction.

6. The optical communication system of claim 5, further comprising:

a remote device configured to receive the optical information signal; and a second optical connection with a first end coupled to the rotor of the second optical rotary joint and a second end coupled to the remote device, wherein the first end of the second optical connection remains in a substantially stationary position as the gimbal orients the moveable portion in the desired position.

7. The optical communication system of claim 6, wherein the optical communication device and the remote device communicate the optical information signal between each other via the first optical connection, the optical connector, and the second optical connection.

8. The optical communication system of claim 1, wherein the optical connector is a fiber optic cable.

9. A method for holding optical connections of a gimbal system stationary during movement of a moveable portion of the gimbal system, the method comprising:

rotating a first rotational member of the gimbal system about a first axis, wherein a stator of a first optical rotary joint affixed to the first rotational member rotates about the first axis, and wherein an end of a first optical connection coupled to a rotor of the first optical rotary joint remains substantially stationary with respect to a rotation about the first axis as the stator of the first optical rotary joint rotates about the first axis; and rotating a second rotational member of the gimbal system about a second axis, wherein a stator of a second optical rotary joint affixed to the second rotational member rotates about the second axis, and wherein an end of a second optical connection coupled to a rotor of the second optical rotary joint remains substantially stationary with respect to a rotation about the second axis as the stator of the second optical rotary joint rotates about the second axis.

10. The method of claim 9, wherein an optical connector with a first end coupled to the stator of the first optical rotary joint and with a second end coupled to the stator of the second optical rotary joint remains substantially stationary as the stators of the first and the second optical rotary joints rotate.

11. A method for communicating optical signals from an optical communication device affixed to a moveable portion of a gimbal system, the method comprising:

communicating an optical signal from the optical communication device over a first optical connection, the first optical connection having an end coupled to a rotor of a first optical rotary joint;

communicating the optical signal from the end of the first optical connection through an optical connector, the optical connector having a first end coupled to a stator of the first optical rotary joint that is affixed to a first rotational member of the gimbal system, and having a second end coupled to a stator of a second optical rotary joint that is affixed to a second rotational member of the gimbal system; and communicating the optical signal from the second end of the optical connector to an end of a second optical connection, the end of the second optical connection coupled to a rotor of the second optical rotary joint, wherein the end of the first optical connection remains substantially stationary with respect to a rotation about the first axis as the stator of the first optical rotary joint rotates about a first axis, wherein the end of the second optical connection remains substantially stationary with respect to a rotation about the second axis as the stator of the second optical rotary joint rotates about a second axis; and wherein the optical connector remains substantially stationary as the stator of the first optical rotary joint rotates about the first axis and as the stator of the second optical rotary joint rotates about the second axis.

12. The method of claim 11, further comprising:

rotating a first rotational member of the gimbal system about the first axis, wherein the stator of the first optical rotary joint affixed to the first rotational member rotates about the first axis; and rotating a second rotational member of the gimbal system about the second axis, wherein the stator of the second optical rotary joint affixed to the second rotational member rotates about the second axis.

13. The method of claim 11, further comprising:

pointing a radar antenna in a desired direction in response to rotating at least one of the first rotational member and the second rotational member.

14. The method of claim 13, further comprising:

receiving a returned radar signal at the radar antenna; and generating the optical signal based upon the returned radar signal.

15. The method of claim 11, further comprising:

communicating the optical signal to a remote device coupled to the second optical connection.

* * * * *